United States Patent [19]
McCann et al.

[11] 3,776,725
[45] Dec. 4, 1973

[54] BI-STIMULUS PRINT

[75] Inventors: John J. McCann, Belmont; Julius J. Scarpetti, Revere, both of Mass.

[73] Assignee: Polaroid Corporation, Cambridge, Mass.

[22] Filed: Dec. 1, 1971

[21] Appl. No.: 203,688

[52] U.S. Cl. .............................. 96/2, 96/7, 96/14, 96/17, 96/41, 96/44, 350/132, 96/40
[51] Int. Cl. .............................................. G03c 7/00
[58] Field of Search ...................... 96/41, 44, 2, 14, 96/17, 40; 350/132

[56] References Cited
UNITED STATES PATENTS
| | | | |
|---|---|---|---|
| 2,887,007 | 5/1959 | Ryan | 96/40 |
| 3,142,563 | 7/1964 | Alexander | 96/2 |
| 2,232,032 | 2/1941 | Kroner | 96/41 |
| 2,299,015 | 10/1942 | Gilmore | 96/2 |

*Primary Examiner*—Norman G. Torchin
*Assistant Examiner*—Richard L. Schilling
*Attorney*—Michael Bard et al.

[57] ABSTRACT

An improved bi-stimulus print is disclosed which provides more faithful rendition of the colors perceived therein. One perceives color in an image recorded on a bi-stimulus print by illuminating the front of the bi-stimulus print with light having one wavelength distribution and by simultaneously illuminating the back with light having another wavelength distribution and viewing, together, an image conveyed from the front by reflected light and another image conveyed from the back by transmitted light. A negative of the front image located on the back of the improved bi-stimulus print in precise registration with the other images compensates for the modulation of the transmitted light by the front image. Improved bi-stimulus anaglyphs are also described.

21 Claims, 1 Drawing Figure

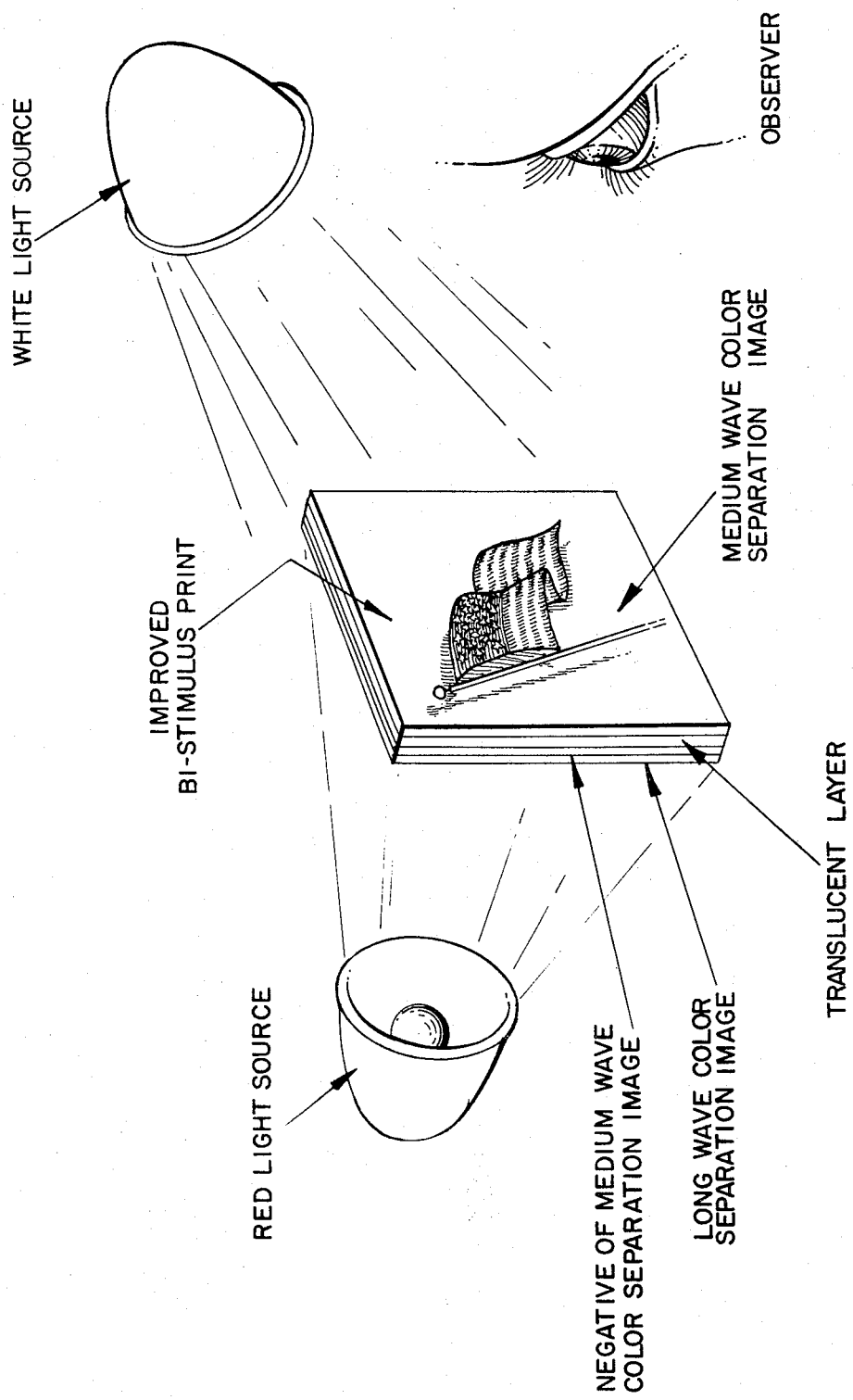

BI-STIMULUS PRINT

BACKGROUND OF THE INVENTION

Copending U.S. Pat. application, Ser. No. 203,989, filed on even data herewith discloses a novel bi-stimulus print.

Bi-stimulus prints comprise two separate photographs representing different aspects of a subject, e.g., color or perspective. In one embodiment, the photographs are color separation images taken from the same vantage point. The first monochrome photograph records the relative intensities of the middle wavelength color stimuli present in the subject by, for example, using a green filter to absorb and block the longer wavelengths. The second monochrome photograph records the relative intensities of the longer wavelength color stimuli present in the subject by, for example, using a red filter to absorb and block the shorter wavelengths. These photographs are referred to as the middle wavelength record and the long wavelength record, respectively. The middle wavelength record and the long wavelength record are printed in monochrome on opposite sides of a translucent sheet in precise registration with each other forming the bi-stimulus print. One can view the bi-stimulus print so as to perceive a variegated image of the subject. By simultaneously illuminating the short record of the bi-stimulus print with white light and the long record of the bi-stimulus print with red light, from their respective sides of the translucent sheet, and viewing the bi-stimulus print to see, together, the white light reflected therefrom and the red light transmitted therethrough, one perceives the variegated image of the original subject.

The white light reflected from the front of the bi-stimulus print is modulated only by the densities present in the middle wavelength record. The red light transmitted through the back of the bi-stimulus print is modulated by the densities present in the long wavelength record. However, the transmitted red light is also modulated by the densities in the middle wavelength record as it emerges from the bi-stimulus print. Thus, the transmitted red light has a spurious modulation that might detract from a faithful rendition of the colors a viewer ought to perceive in an image from a bi-stimulus print.

A similar difficulty may be experienced with bi-stimulus anaglyph prints. Thus, the left eye stereoscopic perspective view emanating from the back of a bi-stimulus anaglyph print might suffer spurious modulation on passing through the right eye stereoscopic perspective view printed on the front of the bi-stimulus anaglyph print.

SUMMARY OF THE INVENTION

The invention, according to the present concepts, comprises a bi-stimulus print having two positive color separation images on opposite sides of a translucent sheet, i.e., a long wavelength record for viewing by light transmitted through the bi-stimulus print from behind it and a middle wavelength record for viewing by light reflected from the front of the bi-stimulus print, and a negative image of the middle wavelength record. The negative image is placed on the back of the bi-stimulus print in registration with its positive image on the front of the bi-stimulus print. The positive middle wavelength record and its negative image combine to uniformly attenuate the transmitted light everywhere on the bi-stimulus print; whereas, the positive record alone would spuriously modulate the transmitted light causing an unintended modulation of the long wavelength record transmitted from the rear of the bi-stimulus print.

The negative middle wavelength record, at the rear of the bi-stimulus print, balances the spurious modulation of the transmitted light carrying the long wavelength record through the bi-stimulus print. The combination of negative and positive middle wavelength records uniformly attenuate the brightness of the transmitted stimulus, but this is easily corrected by increasing the intensity of the light source for the transmitted stimulus. The improved bi-stimulus print provides a perception of colors in the image more faithful to the colors in the object than otherwise. Bi-stimulus anaglyph prints improved in a manner like that just described yield an improved stereoscopic image.

Accordingly, an object of the present invention is to improve the rendition of the colors perceived on viewing a bi-stimulus print.

Another object of the present invention is to provide means for overcoming the spurious modulation of the transmitted illumination by the image recorded on the front of the bi-stimulus print.

Other objects of the invention will in part be obvious and will in part appear hereinafter.

Other objects and many of the attendant advantages of the present invention will become more clearly understood by reference to the following detailed description.

FIG. 1 illustrates a system for viewing images made according to the present invention.

THE PREFERRED EMBODIMENT OF THE INVENTION

An improved bi-stimulus print according to the invention comprises long and middle positive color separation images disposed on opposite sides of a translucent sheet plus a negative of one of the color separation images disposed on the side of the translucent sheet opposite its corresponding positive color separation image.

In the preferred method for making an improved bi-stimulus print, two different positive photographs of a multi-colored object are made from precisely the same point of view and with the same magnification. The first photograph, made through a green filter, records the relative intensities of the middle wavelength light in the object. The second photograph, made through a red filter, records the relative intensities of the long wavelength light in the object.

The optimum exposure balance between the red and green records will yield equal densities on both records within the image of any neutral object in the field. An 18 percent grey card, of the type commonly used for color separation photography, placed in the field serves as an ideal neutral object. The red and green color separation exposures are individually adjusted to produce equal densities in the image of the grey card on the red and on the green record. The exact exposure required for each record is determined experimentally and will depend on the film used and other variables known to those familiar with photography. Generally, the red record will require more exposure than the green record to achieve the desired equal densities in the image of a neutral object.

A negative, or reversal photograph, is made from the first positive photograph, the green record, having comparable but opposite densities. That is, the negative should be made so when one places it and the positive that it stems from together in precise registration and views them exclusively by means of transmitted light, the combination will appear as no more than an area of uniform optical density throughout.

While the example set forth herein recites using red and green for the long and short wavelength records, respectively, other colors will also work providing a long wavelength and middle wavelength relation exists between the stimuli chosen.

Using the red and green positive color separation images and the negative of the green color separation image, an improved bi-stimulus print is made by printing the green positive color separation on the front side of a translucent sheet and printing the red positive color separation image together with the negative green color separation image on the rear side of the translucent sheet. All the images, though on opposite sides of the translucent sheet, must be in registration with each other. A thin material such as paper serves quite well.

Printing as used herein includes recording the positive and negative images by direct photography, photocopying, printing with half-tone screens, lithography, and any other suitable method or combination of methods for recording or duplicating the required images. While it is preferred to print the different images on opposite sides of the same translucent sheet, it is also possible to print them on separate sheets and then place them together in registration.

One may view the improved bi-stimulus print as a monochrome, black and white, print by illuminating only the front surface and viewing the improved bi-stimulus print in the reflected light. To view the improved bi-stimulus print so as to perceive a variegated image, one provides a second stimulus by illuminating the rear of the improved bi-stimulus print as well as the front. When illuminating both sides of the improved bi-stimulus print so as to perceive the variegated image in color, a long wavelength-shorter wavelength relation should exist between the light sources.

In the present example, a red light illuminates the long (red) record on the rear of the bi-stimulus print. The translucent sheet transmits the red light modulated according to the densities of both and positive long wavelength (red) record and the negative middle wavelength (green) record. The positive middle wavelength (green) record on the front of the improved bi-stimulus print also modulates the transmitted red light. However, it follows from the preceding description that the net effect of the combined modulation of the red stimulus by the negative and positive middle wavelength records merely reduces the brightness of the transmitted red stimulus, but does not otherwise modify it. A white light illuminates the middle wavelength (green) record on the front of the bi-stimulus print. The receiving sheet reflects the white light modulated according to the densities of the middle wavelength (green) record. The images printed on the back of the color separation print will not affect the modulation of the reflected middle wavelength stimulus.

The use of white light to illuminate the front of the improved bi-stimulus print as the short stimulus provides a more pleasing color balance than would just green light. Also, the use of white light permits the use of an ordinary household lamp for illuminating the bi-stimulus print. The red light source can be a simple light box with a red filter and means for varying the brightness of the light. After placing the improved bi-stimulus print over the light box, the brightness of the red light is adjusted to balance the intensity of the transmitted long wavelength (red) stimulus with the intensity of the reflected middle wavelength (white light) stimulus. In this way, an observer can perceive from the combined sensations produced by the long wavelength and middle wavelength stimuli of the improved bi-stimulus print the variegated image in colors more faithful to those of the original object.

A simple, though not optimum, demonstration of the improved variegated color images obtained with the invention employs self-processing photographic materials of the kind sold by the Polaroid Corporation, Cambridge, Mass. Fresh fruit, arranged on the copy surface of an industrial copy camera, serves as a subject for an improved bi-stimulus print according to the concepts taught herein. Polaroid Type 57 Land film, exposed through a No. 25 Wratten filter for one-eighth second at $f/22$ provides a red record of the fresh fruit, and Polaroid Type 55 Land film, exposed through a No. 58 Wratten filter for 20 seconds at $f/22$, provides both the green record and the green negative. The green negative and the positive red and green records are assembled to form the improved bi-stimulus print so the positive green record will face the observer with the positive red record and the green negative behind and in registration with it. Tape holds the elements of the improved bi-stimulus print together and in registration with each other. When viewed in a lighted room with a red filtered high intensity light behind it, the bi-stimulus print appears to the observer in a greater array of colors than classical color theory predicts.

The reader will understand that wavelengths other than those described are useful in making and viewing an improved bi-stimulus print providing the long wavelength-shorter wavelength relationship is observed. It is not necessary that the wavelengths of light for viewing be the same wavelengths used for recording the improved bi-stimulus print.

In bi-stimulus anaglyph prints having the right eye view at the front and the left eye view at the rear, a negative of the right eye view is disposed at the back of the print in registration with the right eye view at the front. The combined effect of the right eye view negative and the right eye view (positive) on the left eye view transmitted through the bi-stimulus anaglyph print is no more than that of a neutral density filter. It can be overcome merely by increasing the brightness of the rear illumination. The right eye view negative at the rear will not effect light reflected from the right eye view (positive) at the front, but it does prevent spurious modulation of the left eye view when it is transmitted through the bi-stimulus anaglyph print.

It can be readily understood now that many variations and modifications of the present invention are possible in light of the foregoing teachings, including its application to bi-stimulus anaglyph prints, and it will be apparent to those skilled in the art that various changes in form and arrangement may be made to suit certain requirements without departing from the scope of the invention. It is, therefore, to be understood that within the scope of the appended claims, the instant invention may be practiced in a manner than otherwise specifically described herein.

What is claimed is:

1. An article, comprising:
   a translucent sheet layer having front and rear surfaces;
   first means, on said front surface, for modulating light reflected from said front surface so as to convey a first aspect of a subject;
   second means, at said rear surface, for modulating light transmitted through said translucent sheet layer from behind so as to convey through said translucent layer a second aspect of said subject;
   means for compensating the modulation of said transmitted light by said first modulating means, said compensating means situate at said rear surface.

2. The article described in claim 1, further comprising means for establishing and maintaining registration between said first modulating means, said second modulating means, and said compensating means.

3. An improved bi-stimulus print, comprising:
   a translucent sheet having front and rear surfaces;
   a positive first image, recording a first aspect of a subject, at the front of said translucent sheet;
   a negative of said first image at the rear of said translucent sheet in precise registration with said positive first image; and
   a positive second image, recording a second aspect of said subject, also at the rear of said translucent sheet and in registration with said positive first image and said negative of said first image.

4. The improved bi-stimulus print described in claim 3, wherein said first and second aspects of said subject are stereoscopically related perspectives of said subject.

5. The improved bi-stimulus print described in claim 4, wherein said first and second aspects of said subject are stereoscopically related left eye and right eye views of said subject.

6. The improved bi-stimulus print described in claim 3, wherein said first and second aspects of said subject are first and second color separation images thereof.

7. An improved bi-stimulus print, comprising:
   a translucent sheet having front and rear surfaces;
   a positive first color separation image of a subject at the front of said translucent sheet;
   a negative of said first color separation image at the rear of said translucent sheet in precise registration with said positive first color separation image; and
   a positive second color separation image of said subject also at the rear of said translucent sheet and in registration with said positive and said negative of said first color separation image.

8. The improved bi-stimulus print of claim 7, wherein said first color separation image records the relative intensities of color stimuli in said subject associated with middle wavelengths of light, and said second color separation image records the relative intensities of color stimuli in said subject associated with long wavelengths of light.

9. The bi-stimulus print of claim 8, wherein said first color separation image records the relative intensities of color stimuli in said subject associated with a wavelength shorter than 580 nanometers, and said second color separation image records the relative intensities of color stimuli in said object associated with a wavelength longer than 580 nanometers.

10. The bi-stimulus print of claim 9, wherein said first color separation image records the relative intensities associated with green color in said subject, and said second color separation image records the relative intensities associated with red color in said subject.

11. An improved bi-stimulus print of a subject comprising:
    a translucent sheet having a front surface and a back surface;
    first image means, on said front surface, comprising a positive graphic record of the relative intensities of first color stimuli, associated with a first spectral region, in said subject, for modulating reflected light;
    second image means, on said back surface, comprising a negative graphic record of the relative intensities of said first color stimuli for modulating transmitted light; and
    third image means, on said back surface, comprising a positive graphic record of the relative intensities of second color stimuli, associated with a second spectral region, in said subject for modulating said transmitted light.

12. The improved bi-stimulus print described in claim 11, wherein said second and third image means are in precise registration with said first image means.

13. The improved bi-stimulus print described in claim 12, wherein said first spectral region comprises wavelengths of light shorter than the wavelengths of light comprising said second spectral region.

14. The bi-stimulus print described in claim 13, wherein said first spectral region comprises wavelengths of light shorter than 580 nanometers and said second spectral region comprises wavelengths of light longer than 580 nanometers.

15. The bi-stimulus print described in claim 14, wherein said first spectral region is green and said second spectral region is red.

16. A method for making an improved bi-stimulus print with an image of a subject perceivable in color, comprising the steps of:
    forming a positive first color separation image of said subject;
    forming a negative of said first color separation image;
    forming a positive second different color separation image of said subject;
    recording said images;
    disposing said first positive color separation image on one side of a translucent sheet;
    disposing said negative of said first color separation image and said positive second color separation image on the opposite side of said translucent sheet; and
    registering said images in precise alignment with each other.

17. An improved bi-stimulus print, comprising:
    a translucent sheet with first and second sides;
    a positive green color separation image on said first side of said translucent sheet;
    a negative of said green color separation image on said second side of said translucent sheet in registration with said positive green color separation image; and a positive red color separation image of said subject also on said second side of said translucent sheet and in registration with said positive and said negative of said first color separation image.

18. A system by means of which an image may be viewed, comprising:
   a translucent sheet;
   a positive first image means, on the front of said translucent sheet, for presenting one aspect of a subject;
   a negative of said first image means at the rear of said translucent sheet in registration with said positive first image means;
   a positive second image means, also at the rear of said translucent sheet and in registration with said positive first image means, for presenting a different aspect of said subject;
   means for illuminating the rear of said translucent sheet with one color of light; and
   means for illuminating the front of said translucent sheet with a second color of light, whereby light reflecting from said translucent layer will preclude perception of said second image means by an observer except by means of light transmitted through said translucent layer.

19. The system described in claim 18, wherein said one aspect of a subject and said different aspect of said subject represent right and left stereoscopic perspective views of said subject.

20. The system described in claim 18, wherein said one aspect of a subject and said different aspect of said subject represent different colors within said subject.

21. The system described in claim 20, wherein said one aspect is the green color values in said subject and said different aspect is the red color values of said subject, and wherein said one color of light illuminating the rear of said translucent sheet is red light and said second color of light for illuminating the front of said translucent sheet is white light.

* * * * *